US010531618B2

(12) United States Patent
Marshall

(10) Patent No.: US 10,531,618 B2
(45) Date of Patent: Jan. 14, 2020

(54) PLANT INCUBATOR APPARATUS AND METHOD OF GROWING PLANTS UNDER CONTROLLED CONDITIONS

(71) Applicant: 4D HOLDINGS, LLC, Studio City, CA (US)

(72) Inventor: Aaron Marshall, Studio City, CA (US)

(*) Notice: Subject to any disclaimer, the term of this patent is extended or adjusted under 35 U.S.C. 154(b) by 204 days.

(21) Appl. No.: 15/633,213

(22) Filed: Jun. 26, 2017

(65) Prior Publication Data

US 2018/0368344 A1 Dec. 27, 2018

(51) Int. Cl.
*A01G 31/02* (2006.01)

(52) U.S. Cl.
CPC .................... *A01G 31/02* (2013.01)

(58) Field of Classification Search
CPC ..... A01G 31/02; A01G 27/003; A01G 27/005
See application file for complete search history.

(56) References Cited

U.S. PATENT DOCUMENTS

| 2,592,976 A * | 4/1952 | Thomas | A01G 31/02 47/18 |
| 4,527,353 A * | 7/1985 | Newby | A01G 25/16 222/54 |
| 8,516,742 B1 * | 8/2013 | Azoulay | A01G 31/02 47/62 A |
| 2007/0011944 A1 * | 1/2007 | Triantos | A01G 31/02 47/62 R |
| 2013/0152469 A1 * | 6/2013 | Kao | A01G 31/02 47/62 R |
| 2017/0118964 A1 * | 5/2017 | Tsai | A01K 63/045 |
| 2017/0172084 A1 * | 6/2017 | Fox | A01G 22/00 |
| 2017/0215351 A1 * | 8/2017 | Kremer | A01G 22/00 |
| 2018/0064036 A1 * | 3/2018 | Overgaag | A01G 9/021 |
| 2018/0132434 A1 * | 5/2018 | Fu | A01G 22/00 |
| 2018/0325055 A1 * | 11/2018 | Krakover | A01G 31/06 |

FOREIGN PATENT DOCUMENTS

| DE | 3110782 A1 * | 1/1982 | A01G 27/02 |
| WO | WO-2015171367 A1 * | 11/2015 | A01G 31/02 |

* cited by examiner

*Primary Examiner* — Magdalena Topolski
*Assistant Examiner* — Morgan T Barlow
(74) *Attorney, Agent, or Firm* — Elizabeth Yang

(57) ABSTRACT

A plant incubator apparatus and method of growing plants includes a sloped lower plant housing. The lower plant housing has multiple lower depressions and a lower locking periphery. An upper plant housing is coplanar to the lower plant housing, and has multiple upper depressions that receive a plant growing medium. The depressions are in communication to enable flow of liquid and air. An upper locking periphery detachably mates with the lower locking periphery to form a slot for air circulation. A light guard fits over the upper plant housing to block light from striking a plant from at least one direction. A valve assembly is at the drainage end of the lower plant housing. The valve assembly is in communication with the upper depressions of the upper plant housing to indicate liquid levels and drain excess liquid. A liquid regulation device having a timer automatically controls drainage of liquid.

18 Claims, 15 Drawing Sheets

PLANT INCUBATOR APPARATUS AND METHOD OF GROWING PLANTS UNDER CONTROLLED CONDITIONS

FIELD OF THE INVENTION

The present invention relates generally to a plant incubator apparatus and method of growing plants under controlled conditions. More so, the present invention relates to an apparatus for stimulating plant growth under controlled conditions by dispersing liquid nutrient solution to a plant or germinating seed in the plant growing medium and controlling air circulation around the plant with a liquid regulation device; whereby the apparatus provides a sloped lower plant housing having multiple lower depressions and a lower locking periphery; whereby the apparatus provides an upper plant housing attachable to the lower plant housing having multiple upper depressions that receive a plant growing medium; whereby the depressions are in communication to enable flow of liquid and air; whereby the upper plant housing provides an upper locking periphery that detachably mates with a lower locking periphery of lower plant housing to form a slot for air circulation; whereby the apparatus provides a light guard device that attaches over the upper plant housing to at least partially block light from striking the young plant from at least one direction; whereby the apparatus provides a valve assembly is in communication with the upper depressions of the upper plant housing to indicate levels of liquid nutrient solution and drain excess liquid; and whereby the liquid regulation device regulates delivery of the liquid with a timer and a power switch.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, plants typically require feeding or watering or otherwise supplementing with liquid nutrition at least once weekly to survive. For productive growth, plants require (at least in a limited manner) controlled temperature, humidity, light, nutrient/water levels and in some cases atmospheric composition.

This can be accomplished with a plant incubator. The plant incubator is used to grow plants in a controlled environment for crop production, germination, tissue culture growth, horticulture and landscape architecture, and specialty growth systems. The plant incubator supplies a controlled amount of water to plants at regular intervals for agriculture. Further, plants take up essential elements from the soil through their roots and from the air mainly consisting of nitrogen and oxygen through their leaves.

Other proposals have involved controlled growing environments for plants. The problem with these systems is that they do not provide a uniform distribution of liquid nutrients, and they are expensive to manufacture and operate. Even though the above cited controlled growing environments systems meets some of the needs of the market, a plant incubator apparatus and method of growing plants under controlled conditions that disperses liquid nutrient solution to a plant or germinating seed in the plant growing medium and controls air circulation around the plant, is still desired.

SUMMARY

Illustrative embodiments of the disclosure are generally directed to a plant incubator apparatus and method of growing plants under controlled conditions. The apparatus is configured to stimulate plant growth under controlled conditions by controllably dispersing liquid nutrient solution to a plant or germinating seed in a plant growing medium, allowing for free air circulation around the plant and roots, and releasing excess liquid nutrient solution, so as to prevent damage to the roots.

In some embodiments, the apparatus comprises a lower plant housing that is sloped from an elevated end to a drainage end, so as to enable flowage of liquid nutrient solution to drainage. The lower plant housing is defined by multiple lower depressions that allow liquid nutrient to flow, and also provide sufficient space for roots to grow. The lower plant housing is further defined a lower locking periphery.

In some embodiments, the apparatus further includes an upper plant housing that is disposed coplanar to the lower plant housing. The upper plant housing is defined by multiple upper depressions that allow liquid nutrient to flow, and also provides the roots of the plant sufficient space to grow. The upper plant housing is further defined an upper locking periphery that detachably mates with the lower locking periphery. At least one slot forms between the lower and upper locking peripheries to enable air circulation.

In some embodiments, the apparatus further includes multiple plant growing mediums that are disposed in the upper depressions of the upper plant housing. The plant growing mediums include soil and nutrients that provide an environment for plant growth.

In some embodiments, the apparatus further includes a light guard device detachably attached to the upper plant housing in a coplanar disposition. The light guard works to at least partially block light from striking the plant from at least one direction. The light guard is defined by multiple apertures concentrically formed in the upper depressions. The apertures enable growth of the stem of the plant from the upper plant housing.

In some embodiments, the apparatus further includes a valve assembly disposed at the drainage end of the lower plant housing. The valve assembly is in communication with the upper depressions of the upper plant housing. The valve assembly comprises at least one liquid level indicator that indicates the top of the plant growing mediums, and a predetermined height below the liquid nutrient solution line. The valve assembly comprises multiple lower drain holes that regulate the liquid level. The valve assembly further comprises a drain valve to drain excess liquid from the lower and upper plant housings.

In some embodiments, the apparatus further includes a lid that detachably covers the upper plant housing and the valve assembly. The lid is defined by multiple upper drain holes that selectively cover and uncover the lower drain holes in the valve assembly. The lid forms a channel that is in communication with the upper drain holes. The lid is further defined by at least one air vent to enable air circulation throughout the plants.

In one aspect, a plant incubator apparatus, comprises:
a lower plant housing disposed to slope from an elevated end to a drainage end, the lower plant housing defined by multiple lower depressions, the lower plant housing further defined a lower locking periphery;

an upper plant housing disposed generally coplanar to the lower plant housing, the upper plant housing defined by multiple upper depressions, the upper plant housing further defined an upper locking periphery that detachably mates with the lower locking periphery of the lower plant housing, whereby at least one housing opening forms between the lower and upper depressions, whereby at least one slot forms between the lower and upper locking peripheries;

multiple plant growing mediums disposed in the upper depressions of the upper plant housing, the multiple plant growing mediums comprising nutrients for plant growth;

a light guard device detachably attached to the upper locking periphery of the upper plant housing, the light guard device adapted to at least partially block light from at least one direction, the light guard device defined by multiple apertures;

a valve assembly disposed at the drainage end of the lower plant housing, the valve assembly being in communication with the upper depressions of the upper plant housing, the valve assembly comprising at least one liquid level indicator, the valve assembly further comprising multiple lower drain holes that regulate a liquid level, the valve assembly further comprising a drain valve to drain excess liquid from the lower and upper plant housings;

a delivery tube for delivering a liquid nutrient solution to the valve assembly;

a liquid regulation device operatively connected to the valve assembly, the liquid regulation device for enabling and restricting the draining of the liquid nutrient solution at predetermined durations; and a lid detachably covering the upper plant housing and the valve assembly, the lid defined by multiple upper drain holes selectively covering and uncovering the multiple lower drain holes in the valve assembly, the lid forming a channel in communication with the upper drain holes, the lid is further defined by at least one air vent.

In another aspect, the liquid regulation device comprises a timer that can be preset to regulate the valve assembly, and thereby drainage of excess liquid nutrient solution.

In another aspect, the lower plant housing and the upper plant housing are generally rectangular.

In another aspect, the lower plant housing and the upper plant housing are molded from a single sheet of biodegradable material.

In another aspect, the light guard device comprises a panel and a tab disposed perpendicular to the panel.

In another aspect, the plant growing medium is a 1.6 square inch block.

In another aspect, the valve assembly comprises an inlet tube clip.

In another aspect, the drain valve comprises an outlet tube.

In another aspect, the drain valve comprises a barb.

In another aspect, the lid is Lexan or a transparent polycarbonate material.

In another aspect, the lid is a thermoformed or vacuum formed material.

In another aspect, the apparatus comprises a knob for rotating the multiple upper drain holes.

In another aspect, the multiple upper drain holes and the multiple lower drain holes comprise a Louvre drain hole.

In another aspect, the at least one level indicator comprises a line that indicates a top edge of the multiple plant growing mediums.

In another aspect, the at least one level indicator comprises a line that indicates a lower limit for a liquid nutrient solution.

In another aspect, the at least one air vent of the lid is slidable between an open position and a closed position.

One objective of the present invention is to controllably feed a plant a liquid nutrient solution.

Another objective is to immerse a plant with a liquid nutrient solution from beneath the plant to feed the soil medium and roots of the plant.

Yet another objective is to controllably drain excess liquid nutrient solution from the depressions in the upper and lower plant housings.

Yet another objective is to provide for an even and thorough distribution of water or other liquid nutrition onto a plant.

Yet another objective is to retain moisture within the plant growing medium.

Yet another objective is to promote water conservation.

Yet another objective is to provides a compact design for packing and shipping

Yet another objective is to provide an inexpensive to manufacturer plant incubator apparatus.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A plant incubator apparatus 100 and method 200 of growing plants under controlled conditions is referenced in FIGS. 1-26.

Figure 1:
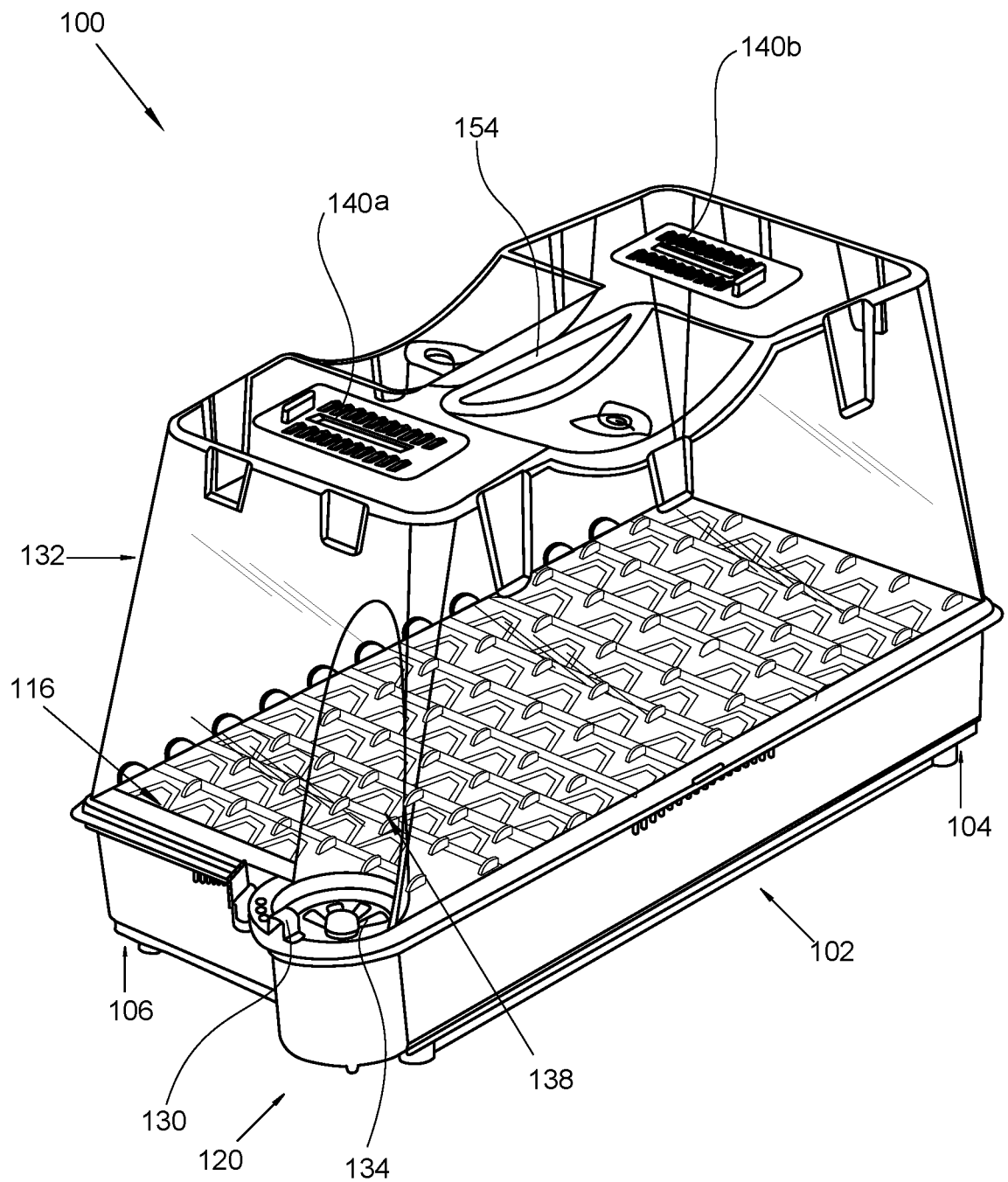
FIG. 1 illustrates a perspective view of an exemplary plant incubator apparatus, in accordance with an embodiment of the present invention.

As illustrated in FIG. 1, the plant incubator apparatus 100, hereafter "apparatus 100" provides facilitated control of air circulation and levels of liquid nutrient solutions to enable optimal plant growth under controlled conditions. This is possible as a liquid nutrient solution 302 is controllably dispersed to a plant 300 or germinating seed in a plant growing medium 114. The air flow is also controlled through use of at least one air vent 140a, 140b that forms in a lid 132, multiple slots 116 that form between lower and upper plant housings 102, 110, and deep depressions 112a-c that contain the plant growing medium 114. Further, the apparatus 100 allows a user to easily identify and discharge excess liquid nutrient solution 302, so as to minimize damage to plant roots.

For purposes of the present invention, the terms "growing medium," "medium," or "media" refer to a liquid in which organic structures such as plants are placed to grow. Though, the assembly may be used with any suitable plant growing medium (e.g., Rockwool, soil, and the like) in a substrate growing system. The term "liquid nutrient solution" refers to any form of liquid nutrition for a plant, including water or other liquids known in the art to support plant growth. The term "Rockwool" refers to the inorganic mineral based horticultural grade Rockwool primarily sold as a hydroponic substrate in the horticultural industry.

Figure 2:
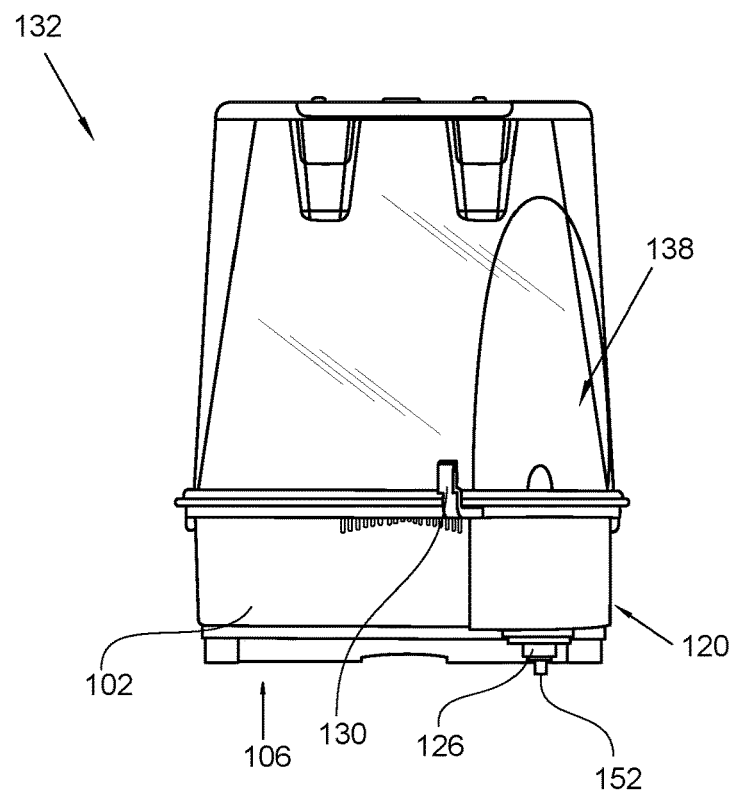
FIG. 2 illustrates a front view of the plant incubator apparatus shown in FIG. 1, in accordance with an embodiment of the present invention.
Figure 3:
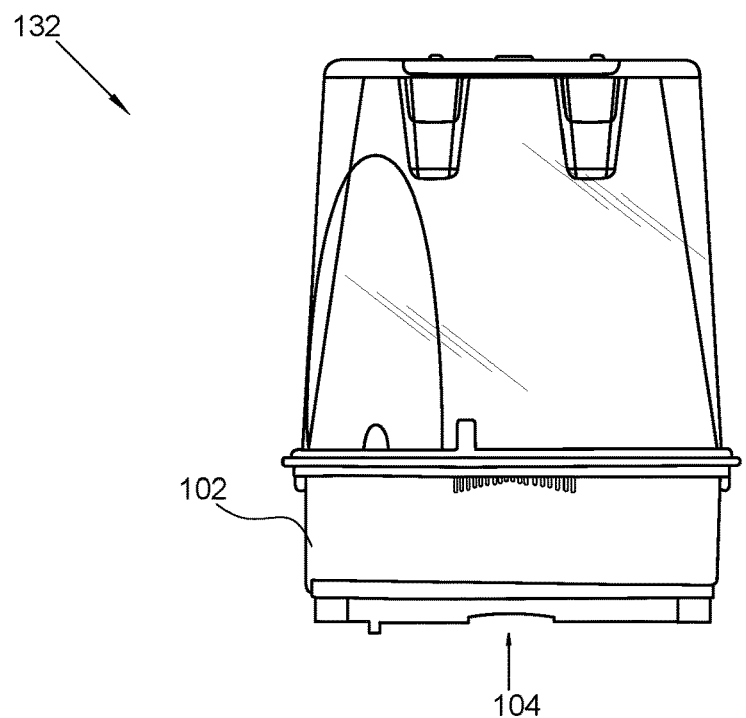
FIG. 3 illustrates a rear view of the plant incubator apparatus shown in FIG. 1, in accordance with an embodiment of the present invention.
Figure 4:
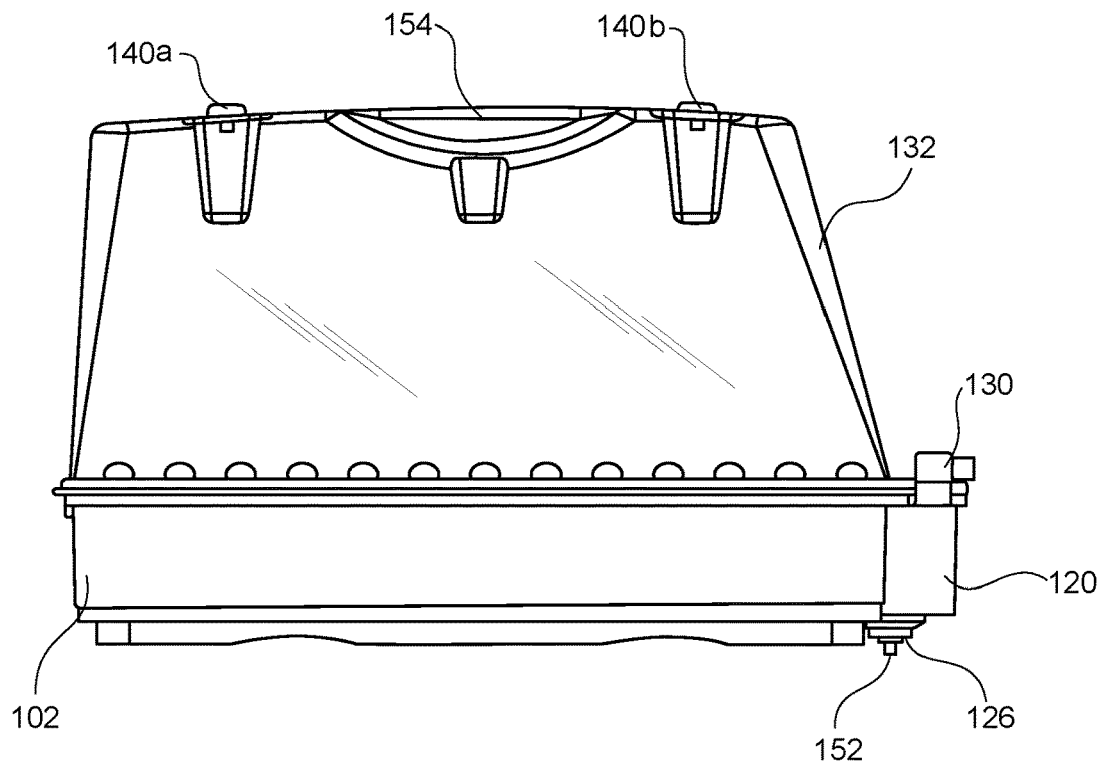
FIG. 4 illustrates an elevated side view of the plant incubator apparatus shown in FIG. 1, in accordance with an embodiment of the present invention.
Figure 5:
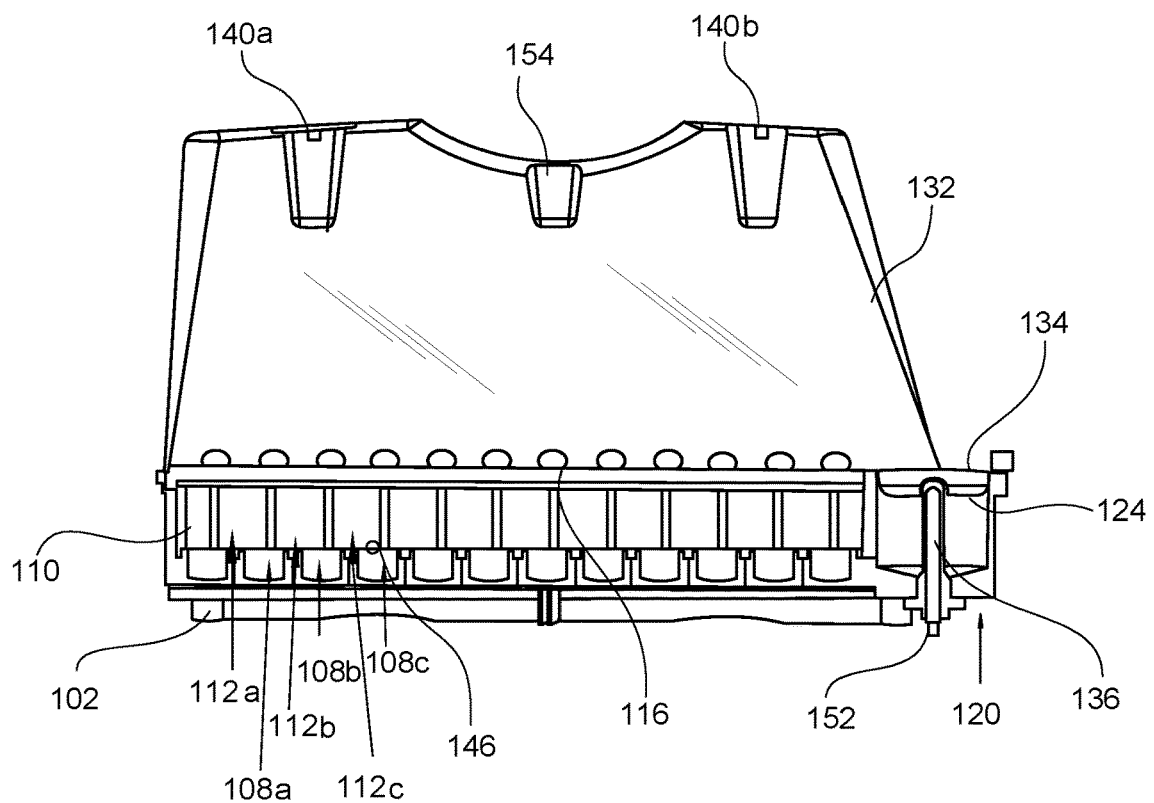
FIG. 5 illustrates a sectioned side view of the plant incubator apparatus shown in FIG. 1, in accordance with an embodiment of the present invention.
Figure 26:
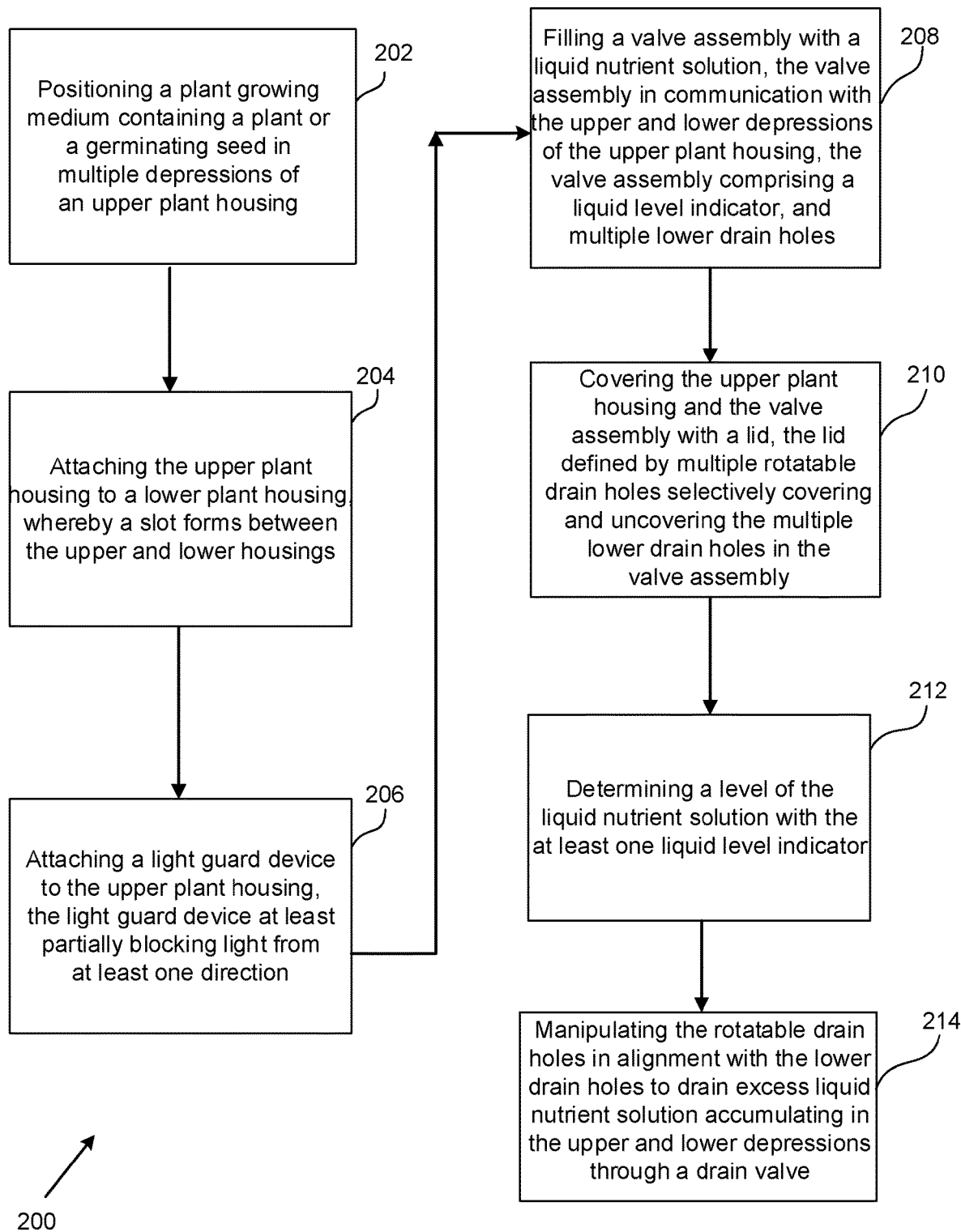
FIG. 26 illustrates a flowchart of an exemplary method of growing plants under controlled conditions, in accordance with an embodiment of the present invention.

Looking now at FIGS. 2 and 3, the apparatus 100 comprises a lower plant housing 102 that is sloped from an elevated end 104 to a drainage end 106. As shown in FIG. 26, this sloped disposition enables flowage of liquid nutrient solution 302 towards a drain valve 126 that can be controlled to restrict or enable free flow of the liquid nutrient solution 302. As shown in FIG. 5, the lower plant housing 102 is defined by multiple lower depressions 108a-c that provides a supportive foundation for the apparatus 100. The lower depressions 108a-c also work to enable the liquid nutrient solution 302 to flow freely, and provide sufficient space for roots to grow. The lower depressions 108a-c are sized and dimensioned to accommodate multiple upper depressions 112a-c, as described below.

As shown in the sectioned view of FIG. 9, the lower plant housing 102 is further defined a lower locking periphery 142 that enables secure fastening with an upper plant housing 110, described below. In some embodiments, the lower plant housing 102 is generally rectangular. Though in other embodiments, other shapes, such as square, circular, and irregular shapes be used. In one embodiment, the lower plant housing 102 is molded from a single sheet of biodegradable material. Though other materials known in the art of horticulture, irrigation, and incubations may be used.

Figure 6:
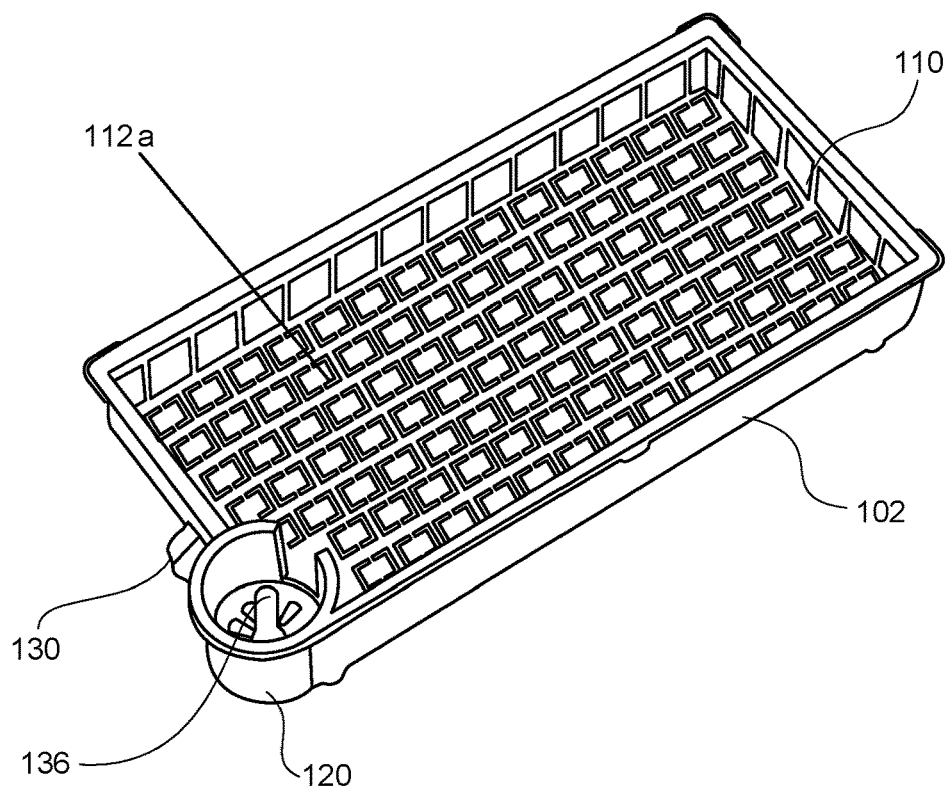
FIG. 6 illustrates a perspective view of an exemplary upper plant housing mounted on a lower plant housing, in accordance with an embodiment of the present invention.

As shown in FIG. 6, the apparatus 100 further includes an upper plant housing 110 that is disposed coplanar to the lower plant housing 102. The upper plant housing 110 rests on top of the lower plant housing 102, and serves to accommodate the plant growing medium 114 and plant 300. Similar to the lower plant housing 102, the upper plant housing 110 is defined by multiple upper depressions 112a-c that receive the plant growing medium 114 and plant 300. The upper depressions 112a-c are sized and dimensioned to allow liquid nutrient to flow, and also provides the roots of the plant 300 sufficient space to grow. A gap may form between the lower and upper depressions 108a-c, 112a-c to provide more air circulation for the roots of the plant 300.

Figure 9:
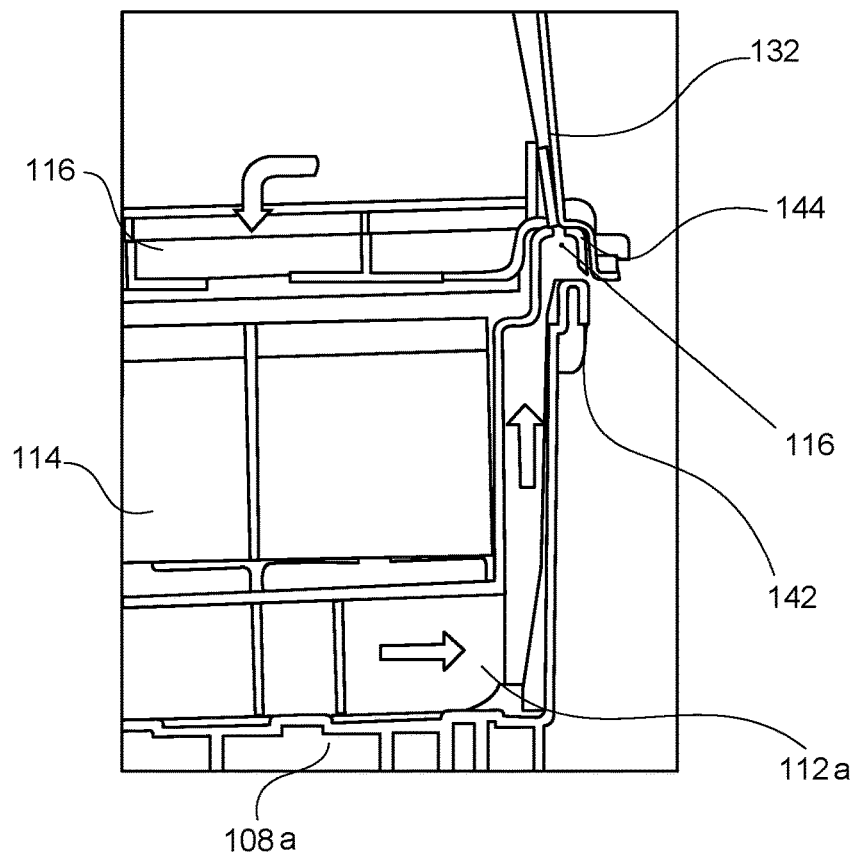
FIG. 9 illustrates a sectioned close up view of an upper locking periphery of the upper plant housing interlocking with an exemplary lower locking periphery of the lower plant housing, and forming a slot therebetween, in accordance with an embodiment of the present invention.

Turning now to FIG. 9, the upper plant housing 110 forms an upper locking periphery 144 that detachably mates with the lower locking periphery 142. In one embodiment, the upper locking periphery 144 is a rounded flange. In mating with the lower locking periphery 142, at least one slot 116 forms between the lower and upper locking peripheries 142, 144. The slot 116 enables air circulation to circulate through the lower and upper depressions 108a-c, 112a-c.

In some embodiments, the upper plant housing 110 is generally rectangular. Though in other embodiments, other shapes, such as square, circular, and irregular shapes be used. In one embodiment, the upper plant housing 110 is molded from a single sheet of biodegradable material. Though other materials known in the art of horticulture, irrigation, and incubations may be used.

Figure 7:
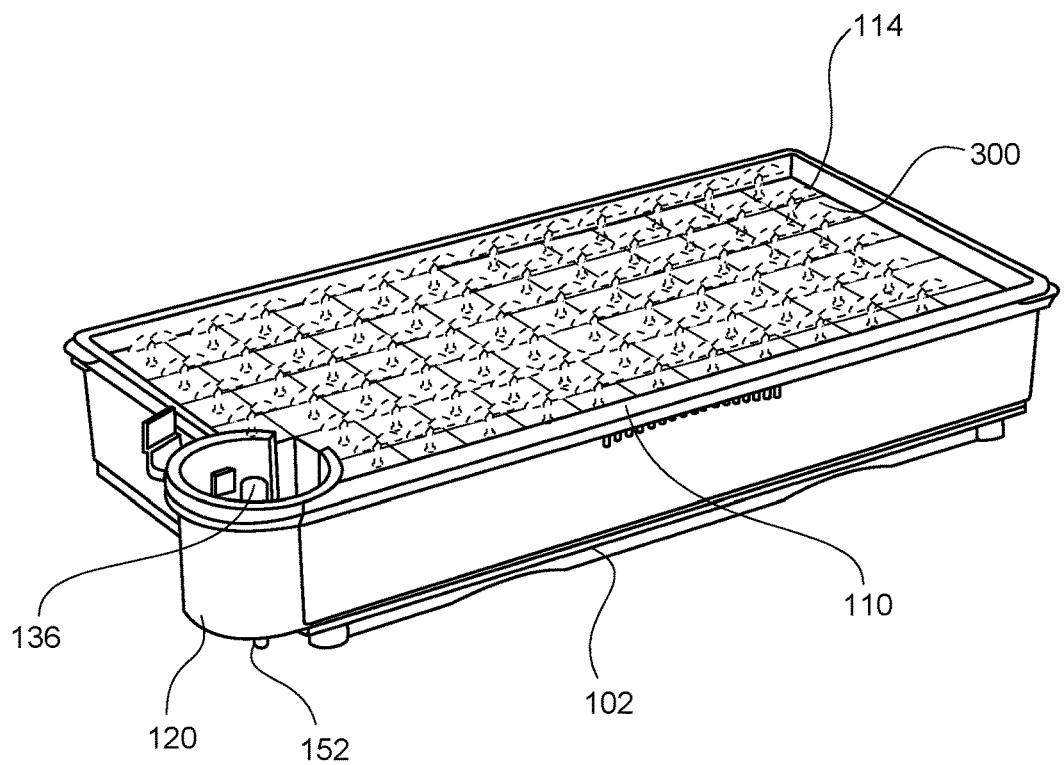
FIG. 7 illustrates a perspective view of the upper plant housing supporting plant growing medium and plants, in accordance with an embodiment of the present invention.

Looking at FIG. 7, the apparatus 100 further includes multiple plant growing mediums 114 that are disposed in the upper depressions 112a-c of the upper plant housing 110. The plant growing medium 114 provides the foundation and nutrients for the plant to grow. In some embodiments, the plant growing mediums 114 may include soil and nutrients that provide an environment for plant growth. In one embodiment, the plant growing medium is a 1.6 square inch block. Though in other embodiments, the plant growing medium is scalable and can be any size or shape that fits in the upper depressions 112a-c. In one embodiment, seventy-two lower and upper depressions 108a-c, 112a-c receive seventy-two plant growing mediums 114.

Figure 8:
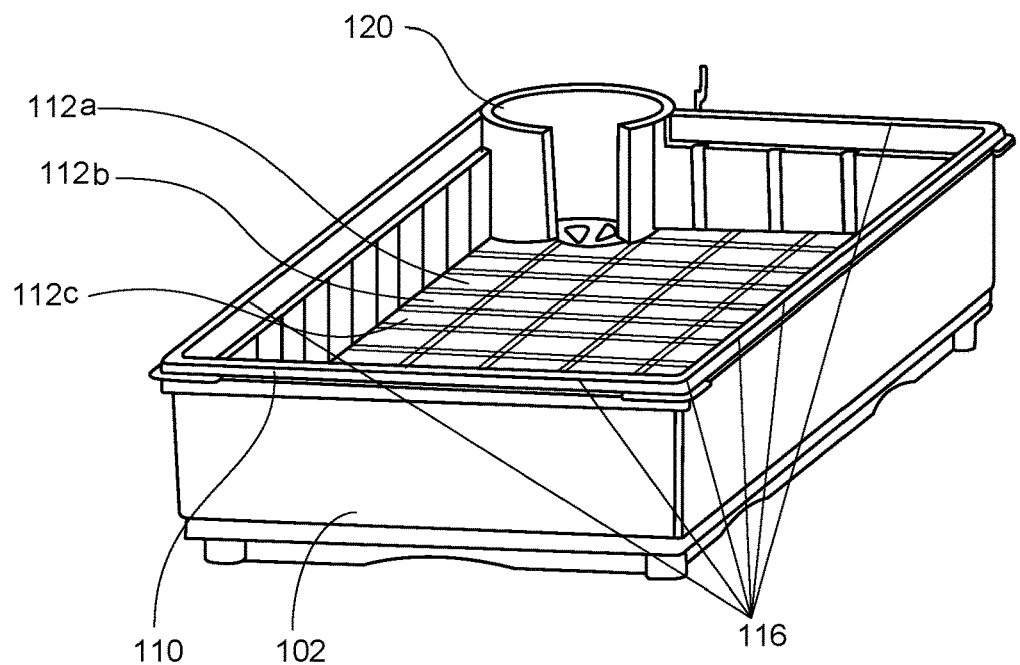
FIG. 8 illustrates a rear view of the upper plant housing mounted on a lower plant housing, in accordance with an embodiment of the present invention.

As discussed above, the plant growing medium 114 positions in the upper depressions 112a, 112b, 112c (FIG. 8). Yet in some embodiments, there is a communication between the upper and lower depressions 112a-c, 108a, 108b, 108c to enable greater liquid flowage and drainage through the roots. In one embodiment, as shown in FIG. 5, at least one housing opening 146 forms between the upper and lower depressions 108a-c, 112a-c to enable liquid nutrient solution and air to pass freely between the plant growth medium 114 and the plant housings 102, 110. The housing opening 146 may include a small orifice or webbing that at least partially enables free flow of liquid and air.

Figure 10:
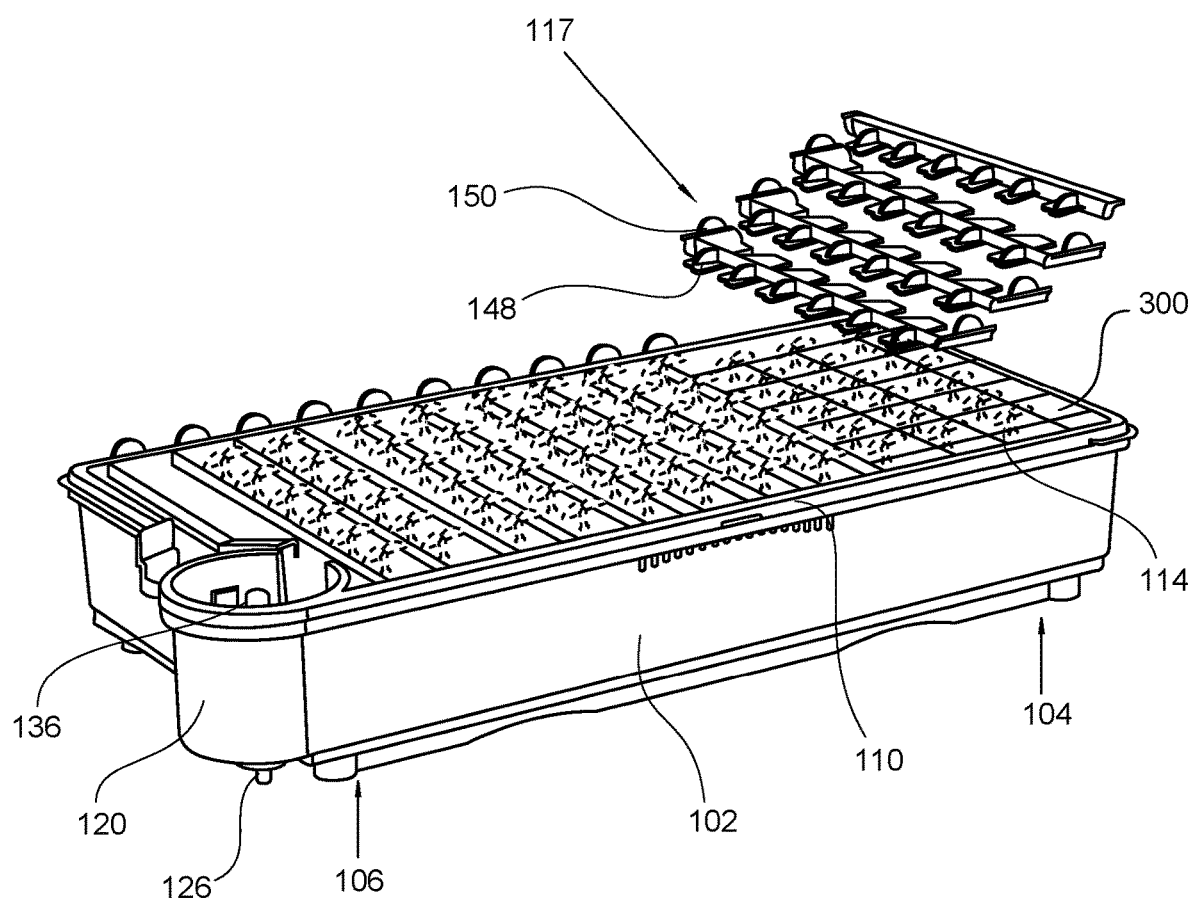
FIG. 10 illustrates a blow up view of an exemplary light guard device operational with a plant incubator apparatus, in accordance with an embodiment of the present invention.

As FIG. 10 references, the apparatus 100 further includes a light guard device 117 that detachably attaches to the upper plant housing 110 in a coplanar disposition. The light guard device 117 works to at least partially block light from striking the plant 300 from at least one direction. In one embodiment, the light guard device 117 comprises a panel 148 and a tab 150 disposed perpendicular to the panel 148.

Figure 11:
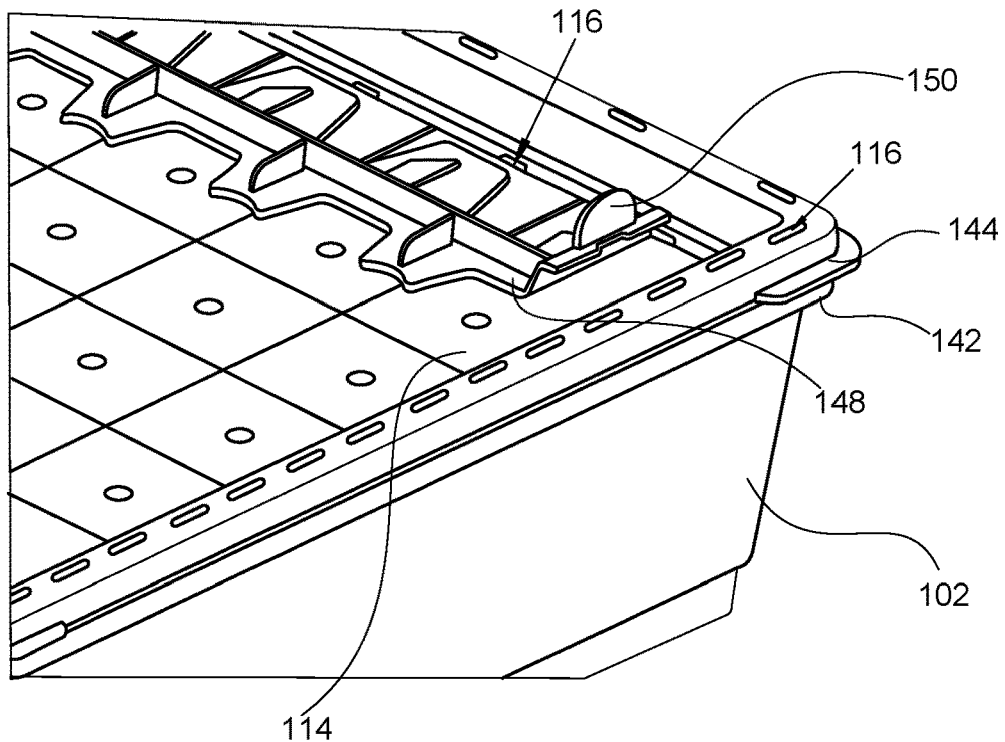
FIG. 11 illustrates a close up view of a light guard device, showing a panel and a tab, in accordance with an embodiment of the present invention.

FIG. 11 shows the tab 150 as perpendicularly disposed to the panel 148, such that the panel 148 covers the plant growing medium and the tab 150 blocks the light from the sides of the plant. The tab may be adjusted to block light as the angle of lighting, such as movement of the sun, changes. In one embodiment, the tab 150 positions in between starter plants to restrict light, including sunlight, from striking the sides of the plant. In general, the light guard works to block large portion of light from reaching the top surfaces of the plant growing mediums 114.

Figure 12:
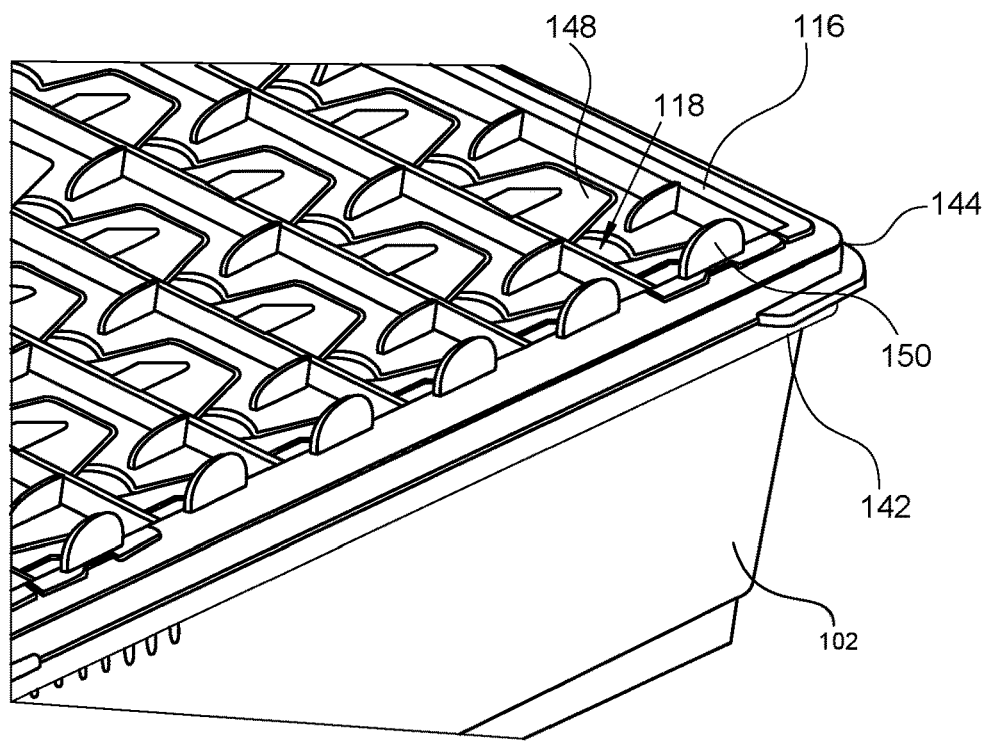
FIG. 12 illustrates a close up view of multiple light guard devices joined across plant growing mediums, and multiple apertures forming to enable passage of the plant stem through the light guard devices, in accordance with an embodiment of the present invention.

Further, when multiple light guard devices are assembled together, as shown in FIG. 12, multiple apertures 118 form between light guard devices. These apertures 118 enable enable passage and growth of the plant stem through the light guard device 116. Suitable materials for the light guard device 116 may include, without limitation, a biodegradable material, a polyethylene, a polymer, and a silicon.

Figure 13:
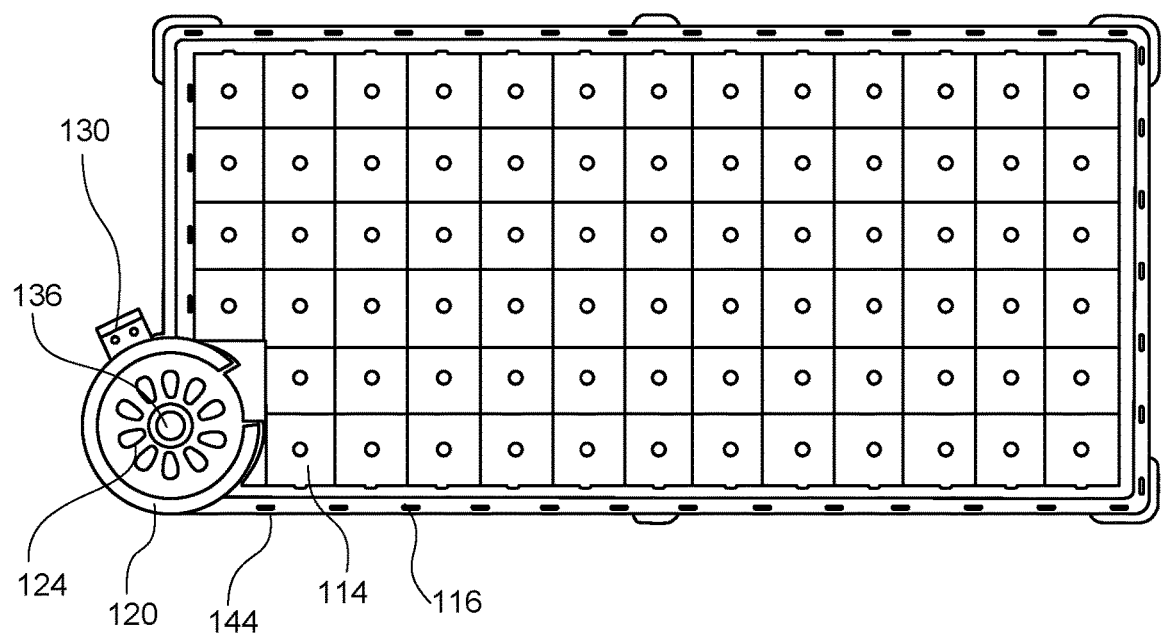
FIG. 13 illustrates a top view of the plant incubator apparatus, showing plant growing mediums, in accordance with an embodiment of the present invention.
Figure 14:
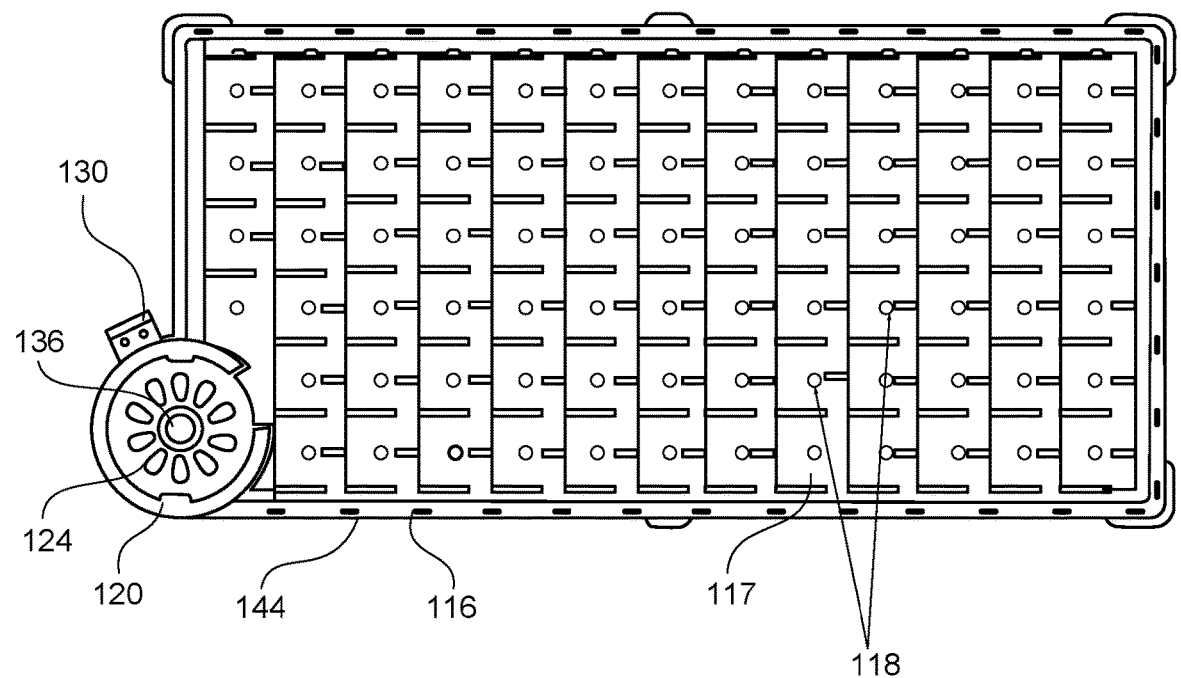
FIG. 14 illustrates a top view of the plant incubator apparatus, showing light guard devices, in accordance with an embodiment of the present invention.

Looking now at the top views of FIGS. 13 and 14, the apparatus 100 further includes a valve assembly 120 that is disposed at the drainage end 106 of the lower plant housing 102. The valve assembly 120 is in communication with the upper depressions 112a-c of the upper plant housing 110. In this manner, the valve assembly 120 regulates discharge of excess liquid nutrient solution from the upper and lower depressions 108a-c.

Referring to FIGS. 13 and 14 of the drawings, an inlet tube clip 130 attaches to the valve assembly 120. The inlet tube clip 130 supports a delivery tube, such as a simple rubber hose that can be pinched between the fingers, so as to controllably feed the liquid nutrient solution 302 into the valve assembly 120. In this manner, the liquid nutrient solution flows into the depressions 108a-c, 112a-c to feed the plant 300.

Figure 15:
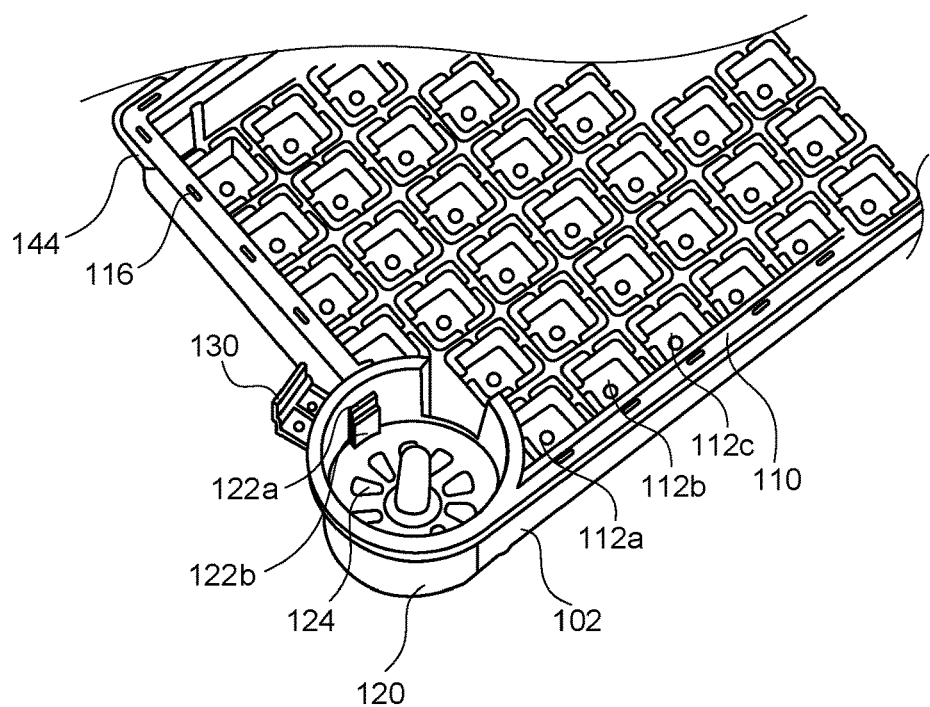
FIG. 15 illustrates a perspective view of an exemplary valve assembly, in accordance with an embodiment of the present invention.

As FIG. 15 references, the valve assembly 120 comprises at least one liquid level indicator 122a-b that indicates the top of the plant growing mediums 114. The liquid level indicator 122a-b allows a user to determine when and if liquid nutrient solution needs to be discharged from the apparatus 100. In one embodiment, the level indicator 122a-b comprises a top line 122a that indicates a top edge of the multiple plant growing mediums 114. This forms a physical marker representing the top of the plant growing mediums 114. In another embodiment, the liquid level indicator 122a-b comprises a lower line 122b that indicates a predetermined height below the liquid nutrient solution line. This may include a lower physical marker that is 0.5" below the top of the liquid line.

In this manner, an operator is aware that the amount of liquid nutrient solution is correct because the liquid nutrient solution should fall between the top and lower lines. If the liquid nutrient solution is above the top line 122a, liquid nutrient solution should be discharged. If the liquid nutrient solution is below the bottom line 122b, liquid nutrient solution should be added.

Figure 16:
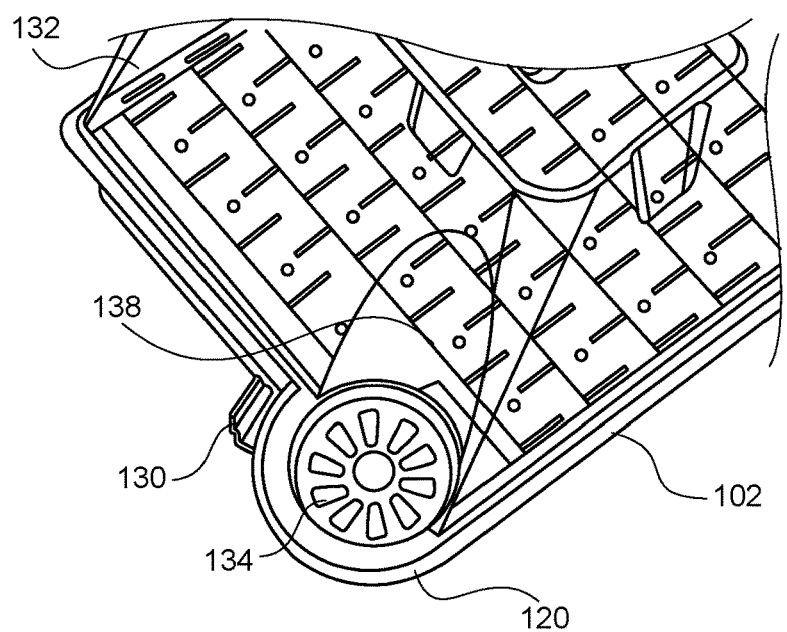
FIG. 16 illustrates a perspective view of an exemplary lid covering the valve assembly, in accordance with an embodiment of the present invention.
Figure 22:
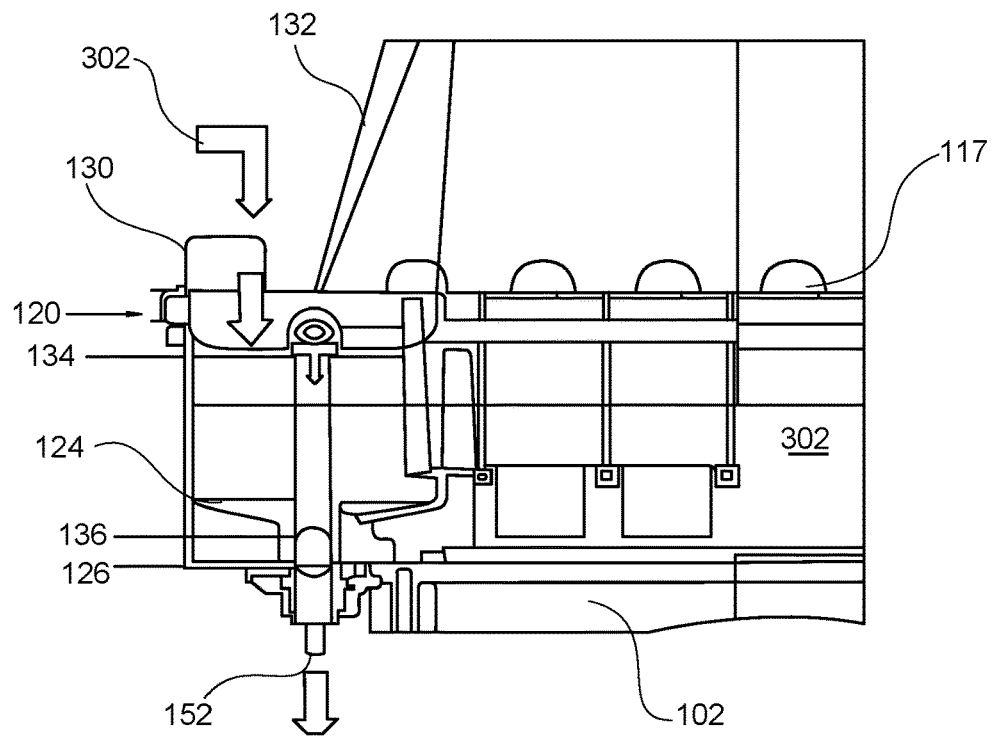
FIG. 22 illustrates a side sectioned view of an a plant incubator apparatus filling with a liquid nutrient solution through the valve assembly, in accordance with an embodiment of the present invention.

Looking at FIG. 16, the valve assembly 120 further comprises multiple lower drain holes 124 that enable passage of excess liquid nutrient solution 302 for discharge from the apparatus 100. In one embodiment, the lower drain holes 124 are radially disposed in a spaced-apart relationship. As shown in FIG. 22, the valve assembly 120 further comprises a drain valve 126 beneath the lower drain holes 124. The drain valve 126 works to carry the excess liquid from the lower and upper plant housing 102, 110.

Figure 17:
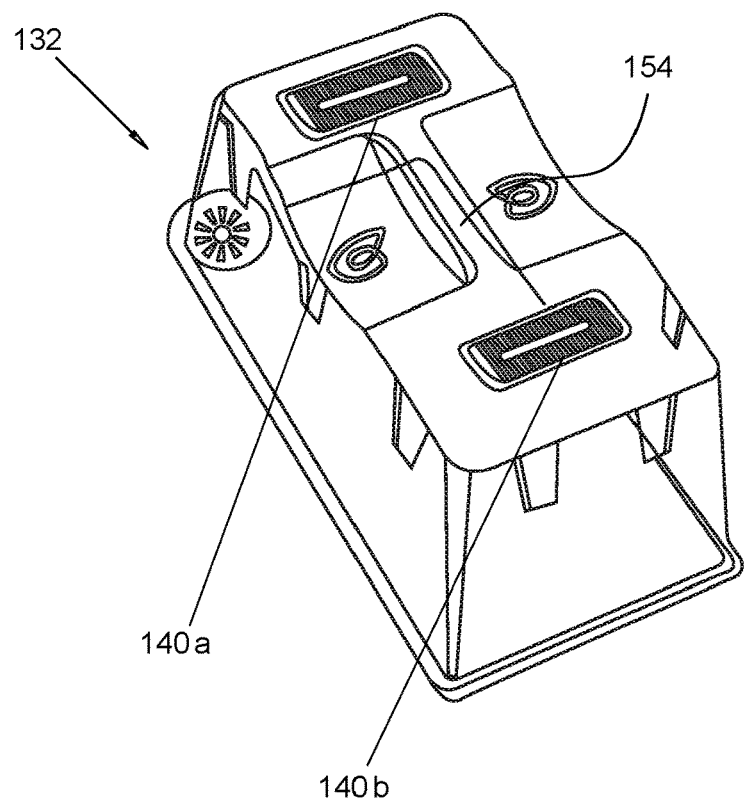
FIG. 17 illustrates a perspective view of an exemplary lid, in accordance with an embodiment of the present invention.

As illustrated in FIG. 17, the apparatus 100 further includes a lid 132 that detachably covers the upper plant housing 110 and the valve assembly 120. The lid 132 may form a generally dome shape that allows for sufficient air circulation for the plants when covering the upper plant housing 110, and contents thereof. In one embodiment, the lid 132 is fabricated from Lexan (a polycarbonate resin thermoplastic) or a transparent polycarbonate material. In another embodiment, the lid 132 is manufactured using a thermoformed or vacuum formed process. Because of the transparent configuration of the lid 132, light easily enters for the plants.

Figure 18:
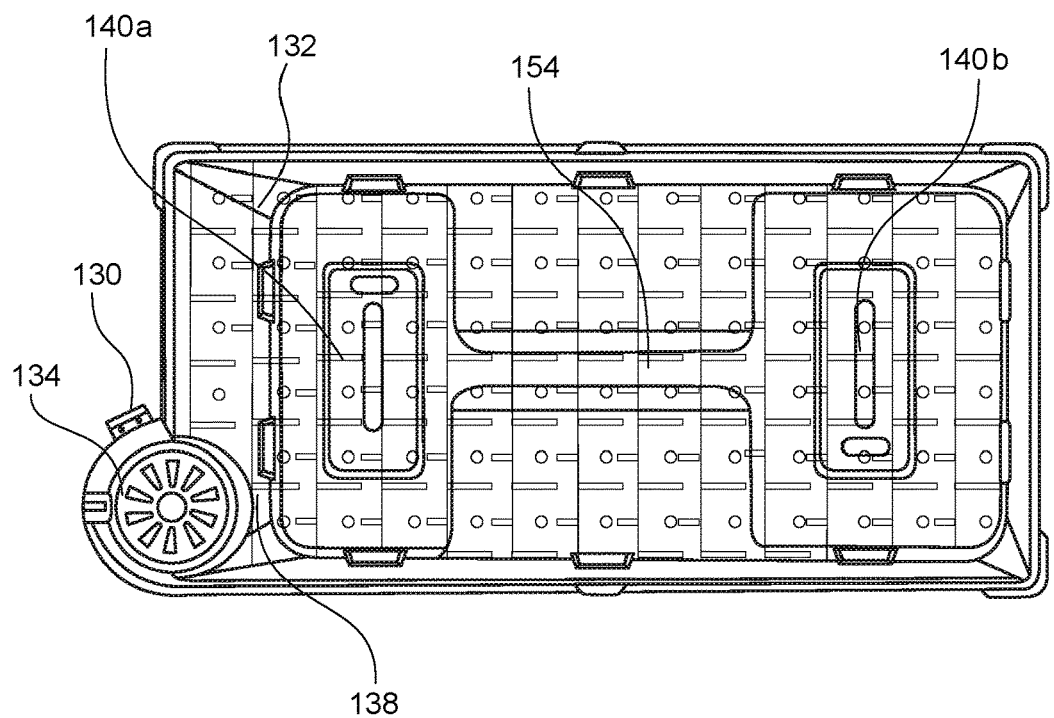
FIG. 18 illustrates a top view of an exemplary lid, in accordance with an embodiment of the present invention.
Figure 19:
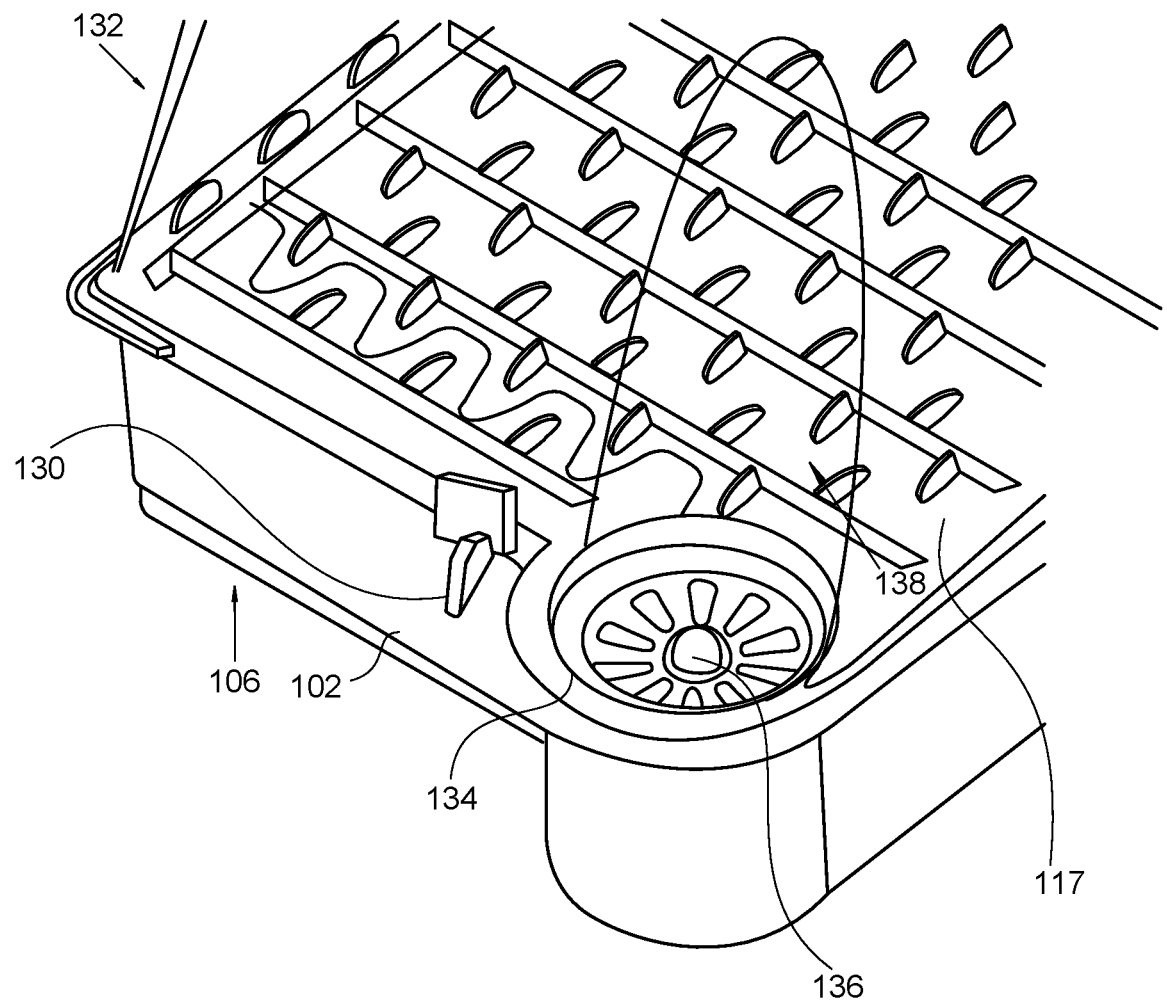
FIG. 19 illustrates a close up view of valve assembly and an exemplary inlet tube clip, in accordance with an embodiment of the present invention.

Looking now at the top view of FIG. 18, the lid 132 is defined by multiple upper drain holes 134 that selectively cover and uncover the lower drain holes 124 in the valve assembly 120. The upper drain holes 134 are integrated into the lid 132, and are sized and dimensioned to form a snug fit over the valve assembly 120, and thereby the lower drain holes 124 (FIG. 19). In one embodiment, a knob 136 is used for rotating, sliding, or otherwise manipulating the upper drain holes 134 in relation to the lower drain holes 124. In this manner, the upper drain holes 134 may be manipulated to cover the lower drain holes 124, and thereby restrict discharge of the liquid nutrient solution. Conversely, the upper drain holes 134 may be manipulated to uncover the lower drain holes 124, and thereby enable at least partial discharge of the liquid nutrient solution away from the apparatus 100. In one embodiment, the lower and upper drain holes 124, 134 form a Louvre drainage-style.

Figure 20:
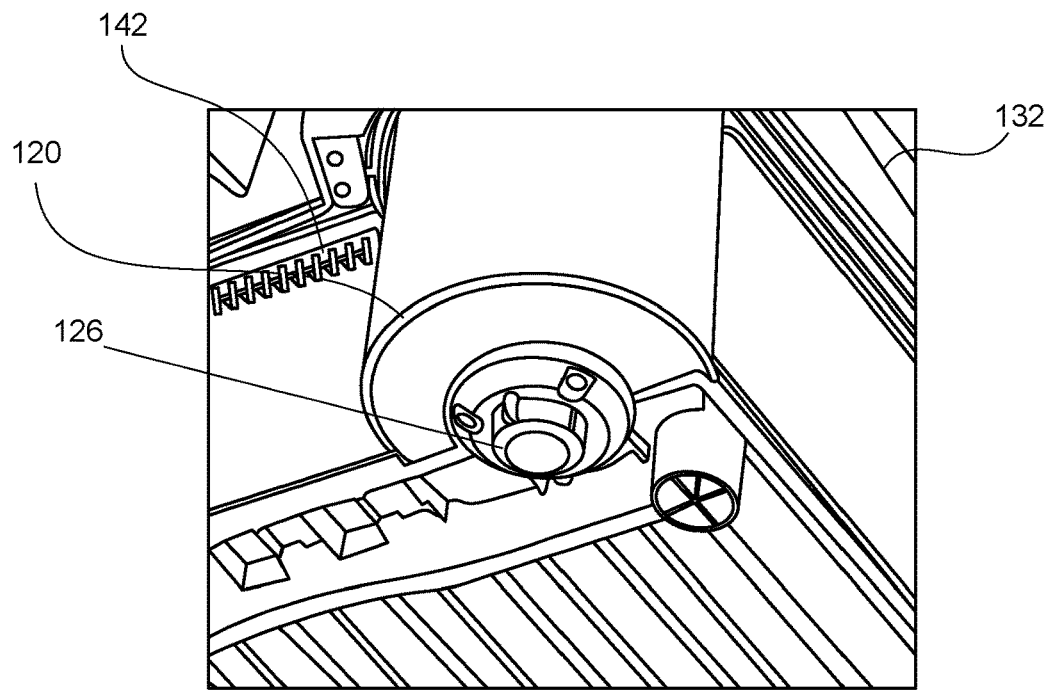
FIG. 20 illustrates a perspective view of an exemplary drain valve, in accordance with an embodiment of the present invention.
Figure 21:
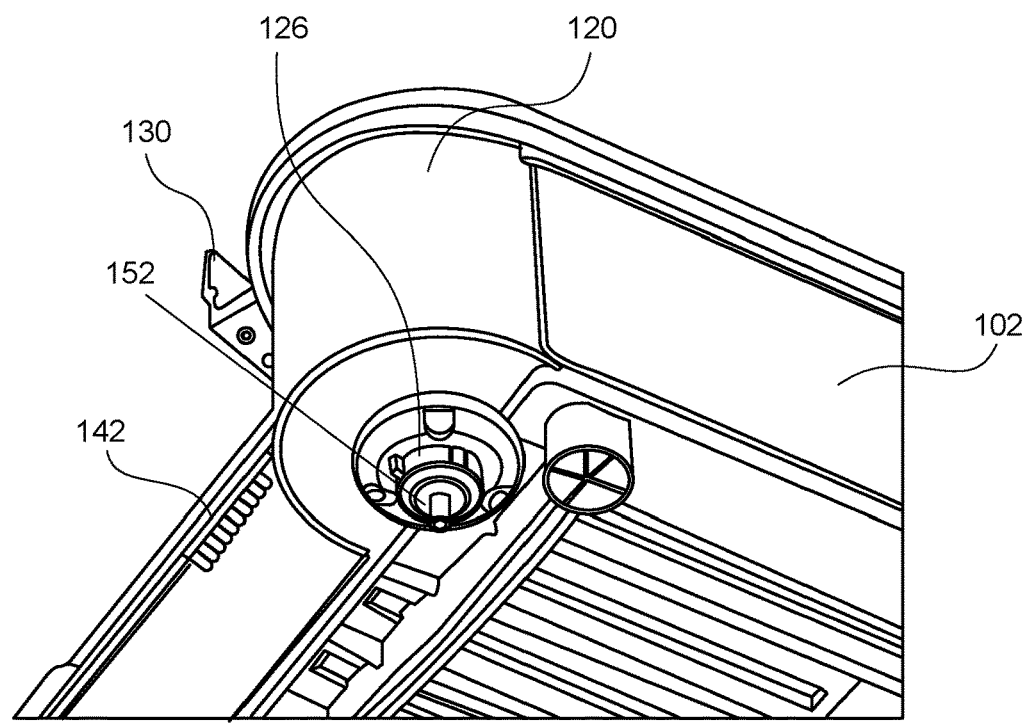
FIG. 21 illustrates a perspective view of the drain valve shown in FIG. 20 with an attached barb, in accordance with an embodiment of the present invention.

Turning now to FIG. 20, when the upper drain holes 134 are misaligned with the lower drain holes 124, the liquid nutrient solution flows out the drain valve 126. The drain valve 126 is selectively in communication with the lower and upper depressions 112a-c, 108a-c such that excess liquid nutrient solution follows a path for discharge therefrom. As shown in FIG. 21, a barb 152 may extend from the drain valve 126. The barb 152 is configured to securely mate with an outlet tube 128. The outlet tube 128 is configured to carry the excess liquid nutrient solution 302 away from the apparatus 100.

As discussed above, the apparatus 100 provides a delivery tube for delivering the liquid to the valve assembly 120. The liquid regulation device operatively connects to the valve assembly for enabling and restricting the draining of the liquid at predetermined durations. In this manner, the liquid regulation device can automate and connect one or multiple apparatuses to a timer or a manual off and on switch.

Thus, a user can automate the precise delivery of the liquid and the pressure of the liquid through the delivery tube and clip, while also determining an appropriate amount of liquid to drain through the valve assembly with the liquid regulation device. The liquid regulation device may be operable by setting a timer when the operator is unavailable to manually regulate the liquid.

For example, a user can set the liquid regulation device to rotate the upper drain holes 134 to uncover the lower drain holes 124, and thereby enable at least partial discharge of the liquid nutrient solution away from the apparatus 100, every four hours. Though any duration of time may be set with the timer of the liquid regulation device. In some embodiments, the liquid regulation device may include a gear mechanism that meshes with the upper drain holes 134 to enable the rotatable or slidable movement thereof.

Looking again at FIG. 19, the lid 132 may form an integrated channel 138 that is in communication with the upper drain holes 134. The channel 138 leads liquid nutrient solution from a liquid source to the valve assembly 120, so as to fill the plant housings 102, 110 with liquid nutrient solution. However, as shown in FIG. 22, an external liquid source may feed the liquid nutrient solution 302 to the valve assembly 120.

Looking again at FIG. 18, the lid 132 is further defined by at least one air vent 140a, 140b that can be manipulated between an open and closed position. The air vent 140a-b enables air circulation into the upper plant housing 110, and throughout the growing medium 114 and plants 300. In some embodiments, the lid 132 is also defined by an integrated handle 154 that provides a grip to manipulate the lid 132. The handle 154 allows the lid 132 to be gripped for covering and uncovering the upper plant housing 110 and valve assembly 120.

Figure 23:
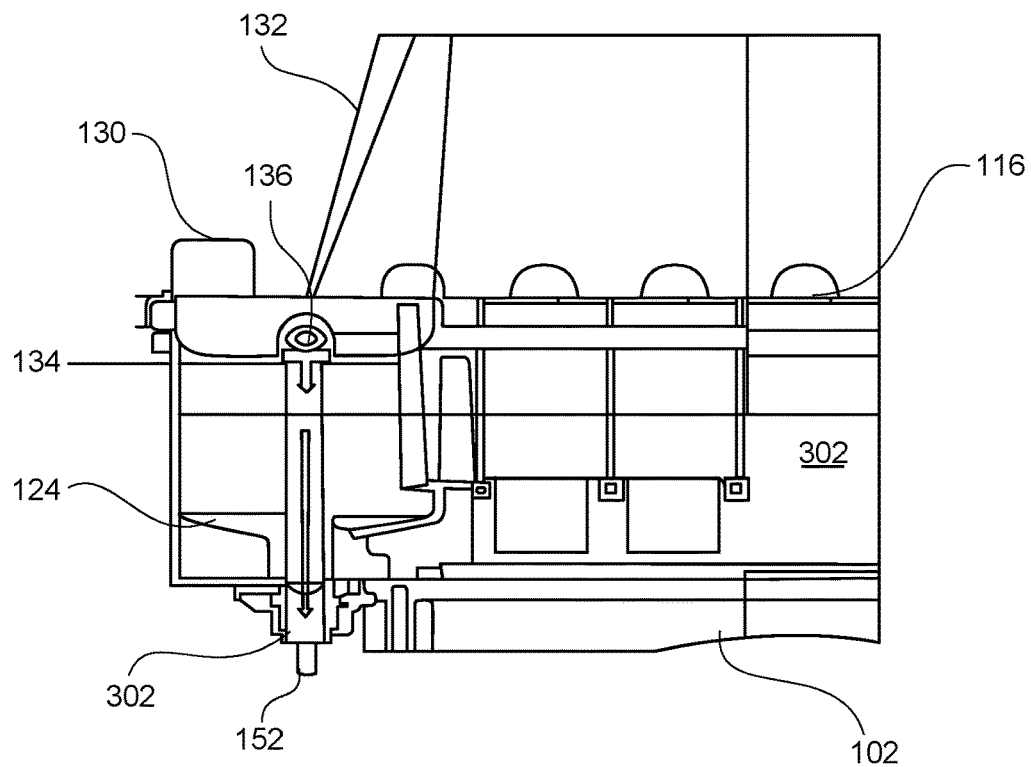
FIG. 23 illustrates a side sectioned view of the plant incubator apparatus shown in FIG. 22 restricting discharge of the liquid nutrient solution, in accordance with an embodiment of the present invention.

In operation, an external liquid source may feed the liquid nutrient solution to the valve assembly 120 (FIG. 22). As the lower and upper plant housing 102, 110 and their respective depressions 108a-c, 112a-c fill with liquid nutrient solution, the liquid level indicator 122a-b is used to determine the cutoff point (FIG. 23).

Figure 24:
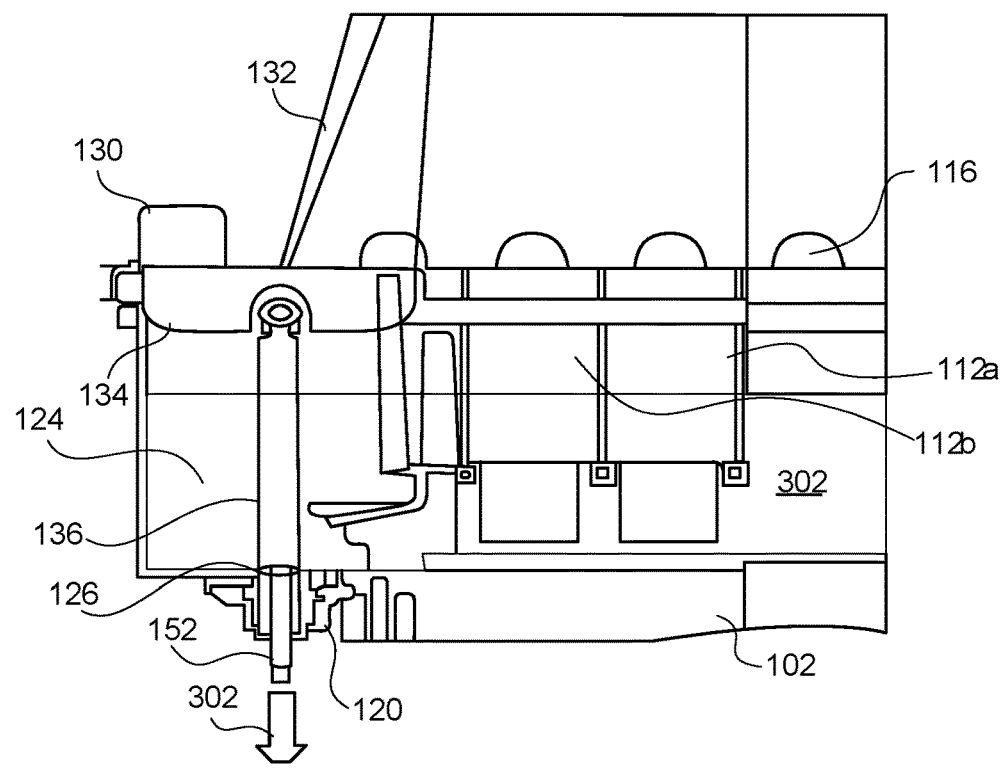
FIG. 24 illustrates a side sectioned view of the plant incubator apparatus shown in FIG. 22 discharging the liquid nutrient solution, in accordance with an embodiment of the present invention.

When excess liquid nutrient solution is present, it may be discharge by rotatably or slidably manipulating the upper drain holes 134 to create a passage for the liquid nutrient solution 302 to pass through the lower drain holes 124, and finally the drain valve 126 (FIG. 24). This may be the case when the plant 300 is saturated or excess liquid nutrient solution has been mistakenly added into the apparatus 100.

For inhibiting such saturation, the apparatus 100 provides a delivery tube for delivering the liquid to the valve assembly, and an accompanying liquid regulation device 156 that operatively connects to the valve assembly for enabling and restricting the draining of the liquid at predetermined durations. The liquid regulation device 156 can automate and connect one or multiple apparatuses to a timer or a manual off and on switch.

Figure 25:
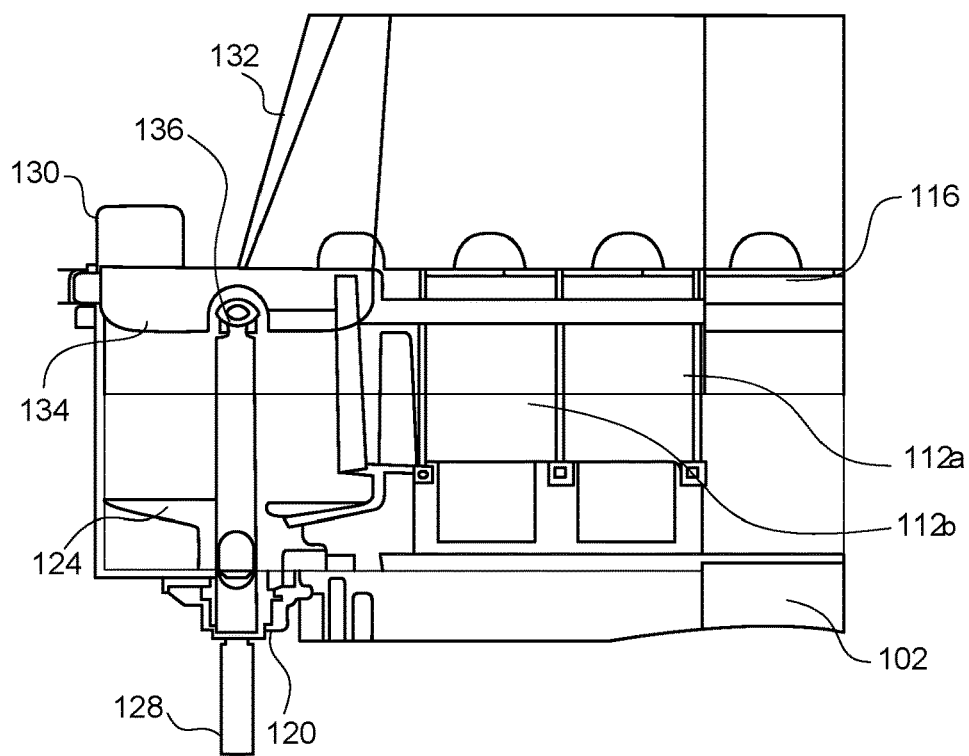
FIG. 25 illustrates a side sectioned view of the plant incubator apparatus shown in FIG. 22 fully discharged of the liquid nutrient solution, in accordance with an embodiment of the present invention.

Thus, a user can precisely control the delivery of the liquid pressure through the delivery tube and clip, while also determining an appropriate amount of liquid to drain through the valve assembly. After the liquid nutrient solution is fully drained, as needed, the air vent 140a-b and slots 116 enable a user to controllably select a desired amount of air to inlet for optimal plant growing conditions (FIG. 25).

FIG. 26 illustrates a flowchart diagram of an exemplary method 200 of growing plants under controlled conditions with a plant incubator apparatus. The method may include an initial Step 202 of positioning a plant growing medium containing a plant or a germinating seed in multiple depressions of an upper plant housing. The method 200 may further comprise a Step 204 of attaching the upper plant housing to a lower plant housing, whereby a slot forms between the upper and lower housings. A Step 206 includes attaching a light guard device to the upper plant housing, the light guard device at least partially blocking light from at least one direction.

In some embodiments, a Step 208 comprises filling a valve assembly with a liquid nutrient solution, the valve assembly being in communication with the upper and lower depressions of the upper plant housing, the valve assembly comprising at least one liquid level indicator, the valve assembly further comprising multiple lower drain holes that regulate a liquid level. A Step 210 includes covering the upper plant housing and the valve assembly with a lid, the lid defined by multiple upper drain holes selectively covering and uncovering the multiple lower drain holes in the valve assembly.

In some embodiments, a Step 212 may include determining a level of the liquid nutrient solution with the at least one liquid level indicator. A Step 214 includes manipulating the multiple upper drain holes in alignment with the multiple lower drain holes to drain excess liquid nutrient solution accumulating in the upper and lower depressions through a drain valve. A final Step 216 may include automatically regulating drainage of the liquid nutrient solution with a liquid regulation device. The liquid regulation device 156 may utilize a timer 158 to automate controlled drainage of the liquid nutrient solution through drain valve.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A plant incubator apparatus, the apparatus comprising:
    a lower plant housing disposed to slope from an elevated end to a drainage end, the lower plant housing comprising multiple lower depressions, the lower plant housing further comprising a lower locking periphery;
    an upper plant housing comprising multiple upper depressions, the upper plant housing further comprising an upper locking periphery that detachably mates with the lower locking periphery of the lower plant housing;
    at least one housing opening forming between the lower and upper depressions;
    at least one slot forming between the lower and upper locking peripheries;
    multiple plant growing mediums disposed in the upper depressions of the upper plant housing, the multiple plant growing mediums comprising nutrients for plant growth;
    a light guard device detachably attached to the upper locking periphery of the upper plant housing, the light guard device adapted to at least partially block light from at least one direction, the light guard device comprising multiple apertures;
    a valve assembly disposed at the drainage end of the lower plant housing, the valve assembly being in communication with the upper depressions of the upper plant housing, the valve assembly comprising at least one liquid level indicator, the valve assembly further comprising multiple lower drain holes that regulate a liquid level, the valve assembly further comprising a drain valve to drain excess liquid from the lower and upper plant housings; and
    a lid detachably covering the upper plant housing and the valve assembly, the lid comprising multiple upper drain holes selectively covering and uncovering the multiple lower drain holes in the valve assembly, the lid forming a channel in communication with the upper drain holes, the lid further comprising at least one air vent.

2. The apparatus of claim 1, wherein each of the upper and lower depressions comprises at least one of the following shapes: a square, a rectangle, a ring, and a circle.

3. The apparatus of claim 1, wherein the upper and lower plant housings are fabricated from at least one of the following: plastic, rubber, metals, alloys, and combinations thereof.

4. The apparatus of claim 1, wherein the upper and lower plant housings are molded from a sheet of biodegradable material.

5. The apparatus of claim 1, wherein the light guard device comprises a panel and a tab, the tab being disposed perpendicular to the panel.

6. The apparatus of claim 1, wherein the plant growing medium is about a 1.6 square inch block.

7. The apparatus of claim 1, wherein the valve assembly comprises an inlet tube clip.

8. The apparatus of claim 7, wherein the drain valve comprises an outlet tube.

9. The apparatus of claim 8, wherein the drain valve comprises a barb for fastening the outlet tube.

10. The apparatus of claim 1, further comprising a knob for manipulating the multiple upper drain holes in relation to the multiple lower drain holes.

11. The apparatus of claim 1, wherein the multiple upper drain holes and the multiple lower drain holes comprise a Louvre drain hole.

12. The apparatus of claim 1, wherein the lid is fabricated from a polycarbonate resin thermoplastic or a transparent polycarbonate material.

13. The apparatus of claim 1, wherein the lid is a thermoformed or vacuum formed material.

14. The apparatus of claim 1, wherein the at least one liquid level indicator comprises a line that indicates a top edge of the multiple plant growing mediums.

15. The apparatus of claim 1, wherein the at least one liquid level indicator comprises a line that indicates a lower limit for a liquid nutrient solution.

16. The apparatus of claim 1, wherein the at least one air vent of the lid is slidable between an open position and a closed position.

17. A plant incubator apparatus, the apparatus consisting of:
    a lower plant housing disposed to slope from an elevated end to a drainage end, the lower plant housing comprising multiple lower depressions, the lower plant housing further comprising a lower locking periphery;
    an upper plant housing comprising multiple upper depressions, the upper plant housing further comprising an upper locking periphery that detachably mates with the lower locking periphery of the lower plant housing;
    at least one housing opening forming between the lower and upper depressions;
    at least one slot forming between the lower and upper locking peripheries;
    multiple plant growing mediums disposed in the upper depressions of the upper plant housing, the multiple plant growing mediums comprising nutrients for plant growth;
    a light guard device detachably attached to the upper locking periphery of the upper plant housing, the light guard device adapted to at least partially block light from at least one direction, the light guard device comprising multiple apertures, the light guard device comprising a panel and a tab, the tab being disposed perpendicular to the panel;
    a valve assembly disposed at the drainage end of the lower plant housing, the valve assembly being in communication with the upper depressions of the upper plant housing, the valve assembly comprising at least one liquid level indicator, the valve assembly further comprising multiple lower drain holes that regulate a liquid level, the valve assembly further comprising a drain valve to drain excess liquid nutrient solution from the lower and upper plant housings, the drain valve comprising a barb and an outlet tube;

an inlet tube clip attached to the valve assembly; and a lid detachably covering the upper plant housing and the valve assembly, the lid comprising multiple upper drain holes selectively covering and uncovering the multiple lower drain holes in the valve assembly, the lid forming a channel in communication with the upper drain holes, the lid further comprising at least one air vent slidable between an open position and a closed position, the lid further comprising an integrated handle, wherein the at least one level indicator comprises a line that indicates a top edge of the multiple plant growing mediums, wherein the at least one level indicator comprises a line that indicates a lower limit for a liquid nutrient solution; and a knob for manipulating the multiple upper drain holes in relation to the multiple lower drain holes.

18. The apparatus of claim 17, wherein the lid is fabricated from a polycarbonate resin thermoplastic or transparent polycarbonate material.

\* \* \* \* \*